(12) United States Patent
Keefer et al.

(10) Patent No.: US 7,250,073 B2
(45) Date of Patent: *Jul. 31, 2007

(54) LIFE SUPPORT OXYGEN CONCENTRATOR

(75) Inventors: Bowie G. Keefer, Galiano Island (CA);
Christopher R. McLean, Vancouver (CA); Matthew L. Babicki, West Vancouver (CA)

(73) Assignee: QuestAir Technologies, Inc., Burnaby, British Columbia (CA)

( * ) Notice: Subject to any disclaimer, the term of this patent is extended or adjusted under 35 U.S.C. 154(b) by 184 days.

This patent is subject to a terminal disclaimer.

(21) Appl. No.: 10/884,854

(22) Filed: Jul. 2, 2004

(65) Prior Publication Data

US 2005/0183572 A1    Aug. 25, 2005

Related U.S. Application Data

(63) Continuation-in-part of application No. 10/358,411, filed on Feb. 4, 2003, now abandoned, which is a continuation of application No. 09/733,606, filed on Dec. 8, 2000, now Pat. No. 6,514,319.

(30) Foreign Application Priority Data

Dec. 9, 1999    (CA) .................................. 2292054

(51) Int. Cl.
*B01D 53/047* (2006.01)
*B01D 53/06* (2006.01)

(52) U.S. Cl. ................. 95/96; 95/102; 95/113

(58) Field of Classification Search ............ 95/96, 95/102, 107, 113; 96/121, 124, 125; 128/204.18, 128/205.11, 205.12

See application file for complete search history.

(56) References Cited

U.S. PATENT DOCUMENTS 1,602,500 A    10/1926    Nuss (Continued)

FOREIGN PATENT DOCUMENTS

CA    1256038    6/1989

(Continued)

OTHER PUBLICATIONS

Chatsiriwech et al., "Enhancement of Catalytic Reaction by Pressure Swing Adsorption," *Catalysis Today* 20, Elsevier Science, pp. 351-366 (1994).

(Continued)

*Primary Examiner*—Frank M. Lawrence
(74) *Attorney, Agent, or Firm*—Klarquist Sparkman, LLP

(57) ABSTRACT

Gas separation by pressure swing adsorption (PSA) and vacuum pressure swing adsorption (VPSA), to obtain a purified product gas of the less strongly adsorbed fraction of the feed gas mixture, is performed with an apparatus having a plurality of adsorbers. The adsorbers cooperate with first and second valves in a rotary PSA module, with the PSA cycle characterized by multiple intermediate pressure levels between the higher and lower pressures of the PSA cycle. Gas flows enter or exit the PSA module at the intermediate pressure levels as well as the higher and lower pressure levels, under substantially steady conditions of flow and pressure. The PSA module may comprise a rotor containing laminated sheet adsorbers and rotating within a stator, with ported valve faces between the rotor and stator to control the timing of the flows entering or exiting the adsorbers in the rotor.

8 Claims, 13 Drawing Sheets

U.S. PATENT DOCUMENTS

| | | | |
|---|---|---|---|
| 2,342,380 A * | 2/1944 | Storment | 196/46 |
| 2,344,384 A | 3/1944 | Altenkirch | |
| 2,751,033 A * | 6/1956 | Miller | 96/124 |
| 3,176,446 A | 4/1965 | Siggelin | |
| 3,252,273 A * | 5/1966 | Stephens | 96/125 |
| 4,272,265 A | 6/1981 | Snyder | |
| 4,354,859 A | 10/1982 | Keller et al. | |
| 4,452,612 A | 6/1984 | Mattia | |
| 4,469,494 A | 9/1984 | Van Weenen | |
| 4,530,705 A | 7/1985 | Firey | |
| 4,702,903 A | 10/1987 | Keefer | |
| 4,758,253 A | 7/1988 | Davidson et al. | |
| 4,781,735 A | 11/1988 | Tagawa et al. | |
| 4,801,308 A | 1/1989 | Keefer | |
| 4,816,039 A * | 3/1989 | Krishnamurthy et al. | 95/97 |
| 4,816,121 A | 3/1989 | Keefer | |
| 4,968,329 A | 11/1990 | Keefer | |
| 4,969,935 A | 11/1990 | Hay | |
| 5,082,473 A | 1/1992 | Keefer | |
| 5,133,784 A | 7/1992 | Boudet | |
| 5,246,676 A | 9/1993 | Hay | |
| 5,248,325 A | 9/1993 | Kagimoto et al. | |
| 5,256,172 A | 10/1993 | Keefer | |
| 5,328,503 A | 7/1994 | Kumar et al. | |
| 5,366,541 A | 11/1994 | Hill et al. | |
| 5,393,326 A | 2/1995 | Engler | |
| 5,411,578 A | 5/1995 | Watson et al. | |
| 5,431,716 A | 7/1995 | Ebbeson | |
| 5,441,559 A | 8/1995 | Petit et al. | |
| RE35,099 E | 11/1995 | Hill | |
| 5,487,775 A | 1/1996 | LaCava et al. | |
| 5,523,326 A | 6/1996 | Dandekar et al. | |
| 5,593,478 A | 1/1997 | Hill et al. | |
| 5,593,480 A | 1/1997 | Poschl | |
| 5,632,804 A | 5/1997 | Schartz | |
| 5,656,067 A | 8/1997 | Watson et al. | |
| 5,658,370 A | 8/1997 | Vigor et al. | |
| 5,711,926 A | 1/1998 | Knaebel | |
| 5,807,423 A | 9/1998 | Lemcoff et al. | |
| 5,814,130 A | 9/1998 | Lemcoff et al. | |
| 5,814,131 A | 9/1998 | Lemcoff et al. | |
| 5,820,656 A | 10/1998 | Lemcoff et al. | |
| 5,827,358 A | 10/1998 | Kulish et al. | |
| 5,891,217 A | 4/1999 | Lemcoff et al. | |
| 5,917,136 A | 6/1999 | Gaffney et al. | |
| 6,051,050 A | 4/2000 | Keefer et al. | |
| 6,056,804 A | 5/2000 | Keefer et al. | |
| 6,063,161 A | 5/2000 | Keefer et al. | |
| 6,176,897 B1 | 1/2001 | Keefer | |
| 6,311,719 B1 | 11/2001 | Hill et al. | |
| 6,514,319 B2 * | 2/2003 | Keefer et al. | 95/101 |
| 6,629,525 B2 | 10/2003 | Hill et al. | |
| 6,651,658 B1 | 11/2003 | Hill et al. | |
| 6,691,702 B2 | 2/2004 | Appel et al. | |
| 2002/0127442 A1 | 9/2002 | Connor et al. | |

FOREIGN PATENT DOCUMENTS

| | | |
|---|---|---|
| CA | 2016045 | 8/1994 |
| CA | 2109055 | 2/1999 |
| CA | 2087972 | 1/2000 |
| CA | 2087973 | 1/2001 |
| EP | 0 143 537 | 3/1990 |
| EP | 0 681 860 A2 | 7/1996 |
| EP | 1 070 531 A2 | 7/2000 |
| GB | 2033777 A | 5/1980 |
| WO | WO 94/04249 | 8/1992 |
| WO | WO 97/39821 | 10/1997 |
| WO | WO 98/29182 | 7/1998 |
| WO | WO 99/01202 | 1/1999 |
| WO | WO 99/28013 | 6/1999 |

OTHER PUBLICATIONS

Hufton et al., "Sorption Enhanced Reaction Process for Hydrogen Production," *AIChE Journal* 45, No. 2, pp. 248-256 (Feb. 1999).

Vaporciyan and Kadlec, "Periodic Separating Reactors: Experiments and Theory," *AIChE Journal* 35, pp. 831-844 (1989).

* cited by examiner

LIFE SUPPORT OXYGEN CONCENTRATOR

CROSS REFERENCE TO RELATED APPLICATION

The present application is a continuation-in-part application of U.S. patent application Ser. No. 10/358,411, filed Feb. 4, 2003, now abandoned, which is a continuation of U.S. patent application Ser. No. 09/733,606, filed on Dec. 8, 2000, now issued on Feb. 4, 2003 as U.S. Pat. No. 6,514,319, both of which prior applications are incorporated herein by reference.

FIELD OF THE INVENTION

The invention relates to gas separations conducted by pressure swing adsorption (PSA), and particularly to air separation to generate concentrated oxygen or to air purification to remove carbon dioxide or vapour contaminants. In particular, the present invention relates to a rotary valve gas separation system having a plurality of rotating adsorbers disposed therein for implementing a pressure swing adsorption process for separating out the gas fractions.

Four possible applications of the present invention are:
 (a) Home use medical oxygen concentrators;
 (b) Portable oxygen concentrators;
 (c) Ultra low power oxygen concentrators, e.g. for third world medical clinics; and
 (d) Manually operated oxygen concentrator or air purifier for survival life support.

BACKGROUND OF THE INVENTION

Gas separation by pressure swing adsorption is achieved by coordinated pressure cycling and flow reversals over an adsorber that preferentially adsorbs a more readily adsorbed component relative to a less readily adsorbed component of the mixture. The total pressure is elevated during intervals of flow in a first direction through the adsorber from a first end to a second end of the adsorber, and is reduced during intervals of flow in the reverse direction. As the cycle is repeated, the less readily adsorbed component is concentrated in the first direction, while the more readily adsorbed component is concentrated in the reverse direction.

A "light" product, depleted in the more readily adsorbed component and enriched in the less readily adsorbed component, is then delivered from the second end of the adsorber. A "heavy" product enriched in the more strongly adsorbed component is exhausted from the first end of the adsorber. The light product is usually the desired product to be purified, and the heavy product often a waste product, as in the important examples of oxygen separation over nitrogen-selective zeolite adsorbents and hydrogen purification. The heavy product (enriched in nitrogen as the more readily adsorbed component) is a desired product in the example of nitrogen separation over nitrogen-selective zeolite adsorbents. Typically, the feed is admitted to the first end of an adsorber and the light product is delivered from the second end of the adsorber when the pressure in that adsorber is elevated to a higher working pressure. The heavy product is exhausted from the first end of the adsorber at a lower working pressure. In order to achieve high purity of the light product, a fraction of the light product or gas enriched in the less readily adsorbed component is recycled back to the adsorbers as "light reflux" gas after pressure letdown, e.g. to perform purge, pressure equalization or repressurization steps.

The conventional process for gas separation by pressure swing adsorption uses two or more adsorbers in parallel, with directional valving at each end of each adsorber to connect the adsorbers in alternating sequence to pressure sources and sinks, thus establishing the changes of working pressure and flow direction. The basic pressure swing adsorption process makes inefficient use of applied energy, because of irreversible expansion over the valves while switching the adsorbers between higher and lower pressures. More complex conventional pressure swing adsorption devices achieve some improvement in efficiency by use of multiple light reflux steps, both to achieve some energy recovery by pressure equalization, and also desirably to sequence the light reflux steps so that lower purity light reflux gas reenters the second end of the adsorbers first, and higher purity light reflux gas reenters the second end of the adsorbers last, so as to maintain the correct ordering of the concentration profile in the adsorbers.

The conventional method of supporting the adsorbent is also problematic. There is a need for rigid high surface area adsorbent supports that can overcome the limitations of granular adsorbent and enable much higher cycle frequencies. High surface area laminated adsorbers, with the adsorbent supported in thin sheets separated by spacers to define flow channels between adjacent sheets, formed either as stacked assemblies or as spiral rolls, have been disclosed by Keefer (U.S. Pat. No. 4,968,329 and U.S. Pat. No. 5,082,473).

U.S. Pat. No. 4,968,329 discloses related gas separation devices with valve logic means to provide large exchanges of fresh feed gas for depleted feed gas. Such large feed exchanges may be required when concentrating one component as a desired product without excessively concentrating or accumulating other components, as in concentrating oxygen from feed air containing water vapour whose excessive concentration and accumulation would deactivate the adsorbent.

Siggelin (U.S. Pat. No. 3,176,446), Mattia (U.S. Pat. No. 4,452,612), Davidson and Lywood (U.S. Pat. No. 4,758,253), Boudet et al (U.S. Pat. No. 5,133,784), and Petit et al (U.S. Pat. No. 5,441,559) disclose PSA devices using rotary adsorber configurations. Ports for multiple angularly separated adsorbers mounted on a rotor assembly sweep past fixed ports for feed admission, product delivery and pressure equalization. In this apparatus, the relative rotation of the ports provides the function of a rotary distributor valve. All of these prior art devices use multiple adsorbers operating sequentially on the same cycle, with multiport distributor rotary valves for controlling gas flows to, from and between the adsorbers.

The prior art includes numerous examples of pressure swing adsorption and vacuum swing adsorption devices with three adsorbers operating in parallel. Thus, Hay (U.S. Pat. No. 4,969,935) and Kumar et al (U.S. Pat. No. 5,328,503) disclose vacuum adsorption systems which do not achieve continuous operation of compressors and vacuum pumps connected at all times to one of the three adsorbers. Such operation is achieved in other three adsorber examples provided by Tagawa et al (U.S. Pat. No. 4,781,735), Hay (U.S. Pat. No. 5,246,676), and Watson et al (U.S. Pat. No. 5,411,578), but in each of these latter examples there is some undesirable inversion of the ordering of light product withdrawal and light reflux steps so that process efficiency is compromised.

SUMMARY OF THE INVENTION

The present invention is intended to enable high frequency operation of pressure swing and vacuum swing adsorption processes, with high energy efficiency and with compact machinery of low capital cost. The invention applies in particular to air separation.

The invention provides an apparatus for PSA separation of a gas mixture containing a more readily adsorbed component and a less readily adsorbed component, with the more readily adsorbed component being preferentially adsorbed from the feed gas mixture by an adsorbent material under increase of pressure, so as to separate from the gas mixture a heavy product gas enriched in the more readily adsorbed component, and a light product gas enriched in the less readily adsorbed component and depleted in the more readily adsorbed component. The apparatus includes compression machinery cooperating with three adsorbers mounted in a rotary PSA module. The apparatus may additionally include multiple sets of three adsorbers mounted in a common rotary PSA module, wherein the compression machinery cooperates with the multiple sets of three beds.

Each adsorber has a flow path contacting adsorbent material between first and second ends of the flow path. The adsorbers are mounted at equal angular spacings in an adsorber housing, which is engaged in relative rotation with first and second valve bodies to define rotary sealing faces of first and second valves adjacent respectively the first and second ends of the adsorber flow paths. In some preferred embodiments, the adsorber housing is a rotor (the "adsorber rotor") which rotates while the first and second valve bodies together form the stator. In other preferred embodiments, the adsorber housing is stationary, while the first and second valve bodies achieve the valving function. Fluid transfer means are provided to provide feed gas to the first valve body, to remove exhaust gas from the first valve body, and to deliver product gas from the second valve body.

The first valve admits feed gas to the first end of the adsorbers, and exhausts heavy product gas from the first end of the adsorbers. The second valve cooperates with the adsorbers to deliver light product gas from the second end of the adsorbers, to withdraw light reflux gas from the second end of the adsorbers, and to return light reflux gas to the second end of the adsorbers. The term light reflux refers to withdrawal of light gas (enriched in the less readily adsorbed component) from the second end of the adsorbers via the second valve, followed by pressure let-down and return of that light gas to other adsorbers at a lower pressure via the second valve. The first and second valves are operated so as to define the steps of a PSA cycle performed sequentially in each of the adsorbers, while controlling the timings of flow at specified total pressure levels between the adsorbers and the compression machinery.

The PSA process of the invention establishes the PSA cycle in each adsorber, within which the total working pressure in each adsorber is cycled between a higher pressure and a lower pressure of the PSA cycle. The higher pressure is superatmospheric, and the lower pressure may conveniently either be atmospheric or subatmospheric. The PSA process also provides intermediate pressures between the higher and lower pressure. The compression machinery of the apparatus in general includes at least one feed gas compressor and at least one heavy product gas exhauster. The exhauster would be a vacuum pump when the lower pressure is subatmospheric. When the lower pressure is atmospheric, the exhauster could be an expander, or else may be replaced by throttle means to regulate countercurrent blowdown.

In the present invention, the feed compressor will typically supply feed gas for feed pressurization of the adsorbers to the first valve means. The exhauster will typically receive heavy product gas for countercurrent blowdown of the adsorbers from the first valve means.

A buffer chamber may be provided to cooperate with the second valve. The buffer chamber may provide the "light reflux" function of accepting a portion of the gas enriched in the second component as light reflux gas from an adsorber at the higher pressure and during concurrent blowdown to reduce the pressure from the higher pressure, and then returning that gas to the same adsorber to provide purge at the lower pressure and then to provide light reflux pressurization to increase the pressure from the lower pressure. The light reflux function enables production of the light product with high purity. A buffer chamber may additionally be employed to allow any other gas flows between adsorbers where the two adsorbers may not be in direct fluid contact at all times.

The present invention performs in each adsorber in a set of 3 adsorbers the sequentially repeated steps within the cycle period as follows:

(A) Feed pressurization and production. Feed gas mixture is admitted to the first end of the adsorber during a feed time interval over approximately 1/3 of the cycle period (0T-T/3), commencing when the pressure within the adsorber is a first intermediate pressure between the lower pressure and the higher pressure, pressurizing the adsorber to the higher pressure (step A1), and then delivering light product gas from the second end (step A2) at a light product delivery pressure which is substantially the higher pressure less minor pressure drops due to flow friction.

(B) Withdraw from the second end a first light reflux gas enriched in the second component (preferably following step A2 of light product delivery) at approximately the higher pressure during a brief time interval at or near the end of step A (T/3).

(C) Equalization to buffer chamber. While flow at the first end of the adsorber is stopped during a concurrent blowdown time interval following step B, withdraw a second light reflux gas enriched in the second component as light reflux gas from the second end of the adsorber into the buffer chamber, and depressurizing the adsorber toward a second intermediate pressure between the higher pressure and the lower pressure.

(D) Withdraw a third light reflux gas from the second end as purge flow for another adsorber, during a brief time interval at approximately the end of step C (T/2).

(E) Countercurrent blowdown and exhaust. Exhaust a flow of gas enriched in the first component from the first end of the adsorber during an exhaust time interval (T/2-5T/6), in step E1 to depressurize the adsorber from the second intermediate pressure to the lower pressure, and then in step E2 transferring a flow of third light reflux gas from the second end of another adsorber undergoing step D to purge the adsorber at substantially the lower pressure while continuing to exhaust gas enriched in the first component as a heavy product gas.

(F) Equalization from buffer chamber. While flow at the first end of the adsorber is stopped, supply second light reflux gas from the buffer chamber to the second end of the adsorber. This increases the pressure of the adsorber from substantially the lower pressure to the second intermediate pressure.

(G) Admit a flow of first light reflux gas from the second end of another adsorber as backfill gas to increase adsorber pressure to the first intermediate pressure for the beginning of step A of the next cycle.

It will be appreciated by those skilled in the art that alternative light reflux flow patterns may be used. For example, delete steps B and G, or delay step B to follow step A rather than overlap step A so it acts as a pressure equalization step. With appropriate porting of the second valve, the apparatus of this invention may be used to implement the process steps of prior art cycles with three adsorbers, for example as prescribed in any of the above cited U.S. Pat. Nos. 4,781,735; 4,969,935; 5,246,676; 5,328,503; and 5,411,578.

The process may be controlled by varying the cycle frequency so as to achieve desired purity, recovery and flow rates of the light product gas. Alternatively, the feed flow rate and the light product flow rate may be adjusted at a given cycle frequency, so as to achieve desired light product purity. Preferably, light product flow rate is adjusted to maintain delivery pressure in a light product receiver, by simultaneously varying feed compressor drive speed and the rotational frequency of the PSA module.

In vacuum embodiments, the first intermediate pressure and second intermediate pressure are typically approximately equal to atmospheric pressure, so that the lower pressure is subatmospheric. Alternatively, the lower pressure may be atmospheric. In air purification applications, the first component is an impurity gas or vapour, the gas mixture is air containing the impurity, and the light product is purified air. In air separation applications, the first component is nitrogen, the second component is oxygen, the adsorbent material includes a nitrogen-selective zeolite, the gas mixture is air, and the light product is enriched oxygen.

In preferred embodiments of the invention, the adsorbent is supported in the form of layered adsorbent or "adsorbent laminate," formed from flexible adsorbent sheets. The adsorbent sheets are thin sheets of adsorbent with a composite reinforcement, or as an inert sheet or foil coated with the adsorbent. Flow channels are established by spacers forming parallel channels between adjacent adsorbent sheets. The channel width between adjacent adsorbent sheets of the adsorbers has been in range of 50% to 200% of the adsorbent sheet thickness. This "adsorbent laminate" configuration has much lower pressure drop than packed adsorbers, and avoids the fluidization problem of packed adsorbers. The adsorbent sheets are typically in the range of 100 to 175 microns thick. The sheet-laminate provides desirable compliance to accommodate stacking or rolling errors, and spacer systems provide the necessary stability against unrestrained deflections or distortions that would degrade the uniformity of the flow channels between adjacent layers of adsorbent sheet.

According to one aspect of the invention there is provided a process for pressure swing adsorption separation of a feed gas mixture containing a more readily adsorbed component and a less readily adsorbed component, with the more readily adsorbed component being preferentially adsorbed from the feed gas mixture by an adsorbent material under increase of pressure, so as to separate from the feed gas mixture a heavy product gas enriched in the more readily adsorbed component and a light product gas enriched in the less readily adsorbed component; providing for the process at least one cooperating set of three adsorbers within a rotor and equally spaced angularly about the axis defined by rotation of the rotor relative to a stator, and rotating the rotor so as to generate within each adsorber cyclic variations of pressure and flow at a cyclic period defined by the frequency of rotation along a flow path contacting the adsorbent material between first and second ends of the adsorber, the cyclic variations or pressure extending between a higher pressure and a lower pressure of the process; rotating the rotor so that the first ends of the adsorbers successively communicate to feed and exhaust ports provided in a first valve surface between the rotor and the stator, and the second ends of the adsorbers successively communicate to a light product port, to light reflux exit ports and to light reflux return ports provided in a second valve surface between the rotor and the stator; the process including for each of the adsorbers in turn:

(a) supplying feed gas mixture at a feed pressure through the feed port to the adsorber over a feed interval which is substantially 1/3 of the cycle period so as to pressurize the adsorber to substantially the higher pressure, and then to deliver light product gas from the light product port at substantially the higher pressure less flow frictional pressure drops;

(b) withdrawing light reflux gas enriched in the less readily adsorbed component from the light reflux exit ports, in part to depressurize that adsorber after the feed interval;

(c) withdrawing second product gas at an exhaust pressure through the exhaust port from the adsorber over an exhaust interval which is substantially 1/3 of the cycle period so as to depressurize that adsorber to substantially the lower pressure while delivering the second product gas; and (d) returning light reflux gas enriched in the less readily adsorbed component from the light reflux return ports so as to purge the adsorber in the latter part of the exhaust interval and then to partially repressurize the adsorber prior to the next feed interval, so that feed gas is continuously supplied to substantially one adsorber at time, and exhaust gas is continuously removed from substantially one adsorber at a time.

According to another aspect of the invention there is provided a process for pressure swing adsorption separation of a feed gas mixture containing a more readily adsorbed component and a less readily adsorbed component, with the more readily adsorbed component being preferentially adsorbed from the feed gas mixture by an adsorbent material under increase of pressure, so as to separate from the feed gas mixture a heavy product gas enriched in the more readily adsorbed component and a light product gas enriched in the less readily adsorbed component, providing for the process at least one cooperating set of three adsorbers within a rotor and equally spaced by 120° angular separation about the axis defined by rotation of the rotor relative to a stator, and rotating the rotor so as to generate within each adsorber cyclic variations of pressure and flow at a cyclic period defined by the frequency of rotation along a flow path contracting the adsorbent material between first and second ends of the adsorber, the cyclic variations of pressure extending between a higher pressure and a lower pressure of the process; rotating the rotor so that the first ends of the adsorbers successively communicate to feed and exhaust ports provided in a first valve surface between the rotor and the stator, and the second ends of the adsorbers successively communicate to a light product port, to first, second and third light reflux exit ports and to first, second and third light reflux return ports provided in a second valve surface between the rotor and the stator; the process including for each of the adsorbers in turn the following cyclical steps in sequence:

(a) supplying feed gas mixture at a feed pressure through the feed port to the adsorber over a feed interval which is substantially 1/3 of the cycle period so as to pressurize the adsorber to substantially the higher pressure, and then to deliver light product gas from the light product port at substantially the higher pressure less flow frictional pressure drops;

(b) withdrawing a first light reflux gas enriched in the less readily adsorbed component from the first light reflux exit port at about the end of the feed interval;

(c) withdrawing a second light reflux gas enriched in the less readily adsorbed component from the first light reflux exit port to depressurize that adsorber after the feed interval;

(d) withdrawing a third light reflux gas enriched in the less readily adsorbed component from the first light reflux exit port to further depressurize that adsorber;

(e) withdrawing second product gas at an exhaust pressure through the exhaust port from the adsorber over an exhaust interval which is substantially 1/3 of the cycle period so as to further depressurize that adsorber to substantially the lower pressure while delivering the second product gas;

(f) returning third light reflux gas from the third light reflux return port which is receiving that gas after pressure letdown from another adsorber (whose phase is leading by 120°), so as to purge the adsorber in the latter part of the exhaust interval;

(g) returning second light reflux gas from the second light reflux return port so as to partially repressurize the adsorber prior to the next feed interval;

(h) returning first light reflux gas from the first light reflux return port which is receiving that gas after pressure letdown from another adsorber (whose phase is lagging by 120°), so as to further repressurize the adsorber prior to the next feed interval; and (i) cyclically repeating the above steps, so that feed gas is continuously supplied to substantially one adsorber at a time, and exhaust gas is continuously removed from substantially one adsorber at a time.

According to a further aspect of the invention there is provided a process for pressure swing adsorption separation of a feed gas mixture containing a more readily adsorbed component and a less readily adsorbed component, with the more readily adsorbed component being preferentially adsorbed from the feed gas mixture by an adsorbent material under increase of pressure, so as to separate from the feed gas mixture a heavy product gas enriched in the more readily adsorbed component and a light product gas enriched in the less readily adsorbed component, providing for the process at least one cooperating set of three adsorbers, and generating within each adsorber cyclic variations of pressure and flow at a cyclic period defined by the frequency of rotation along a flow path contacting the adsorbent material between first and second ends of the adsorber and with the cyclic phase 120° staggered for each adsorber, the cyclic variations of pressure extending between a higher pressure and a lower pressure of the process; the process including for each of the adsorbers in turn the following cyclical steps in sequence:

(a) supplying feed gas mixture to the first end of the adsorber over a feed interval which is substantially 1/3 of the cycle period so as to pressurize the adsorber to substantially the higher pressure, and then to deliver light product gas from the second end of the adsorber at substantially the higher pressure less flow frictional pressure drops, (b) withdrawing a first light reflux gas enriched in the less readily adsorbed component from the second end of the adsorber at about the end of the feed interval;

(c) withdrawing a second light reflux gas enriched in the less readily adsorbed component from the second end of the adsorber to depressurize that adsorber after the feed interval, and delivering the second light reflux gas to a buffer chamber;

(d) withdrawing a third light reflux gas enriched in the less readily adsorbed component from the second end of the adsorber to further depressurize that adsorber;

(e) withdrawing second product gas at an exhaust pressure from the first end of the adsorber over an exhaust interval which is substantially 1/3 of the cycle period so as to further depressurize that adsorber to substantially the lower pressure while delivering the second product gas;

(f) supplying third light reflux gas from another adsorber (whose phase is leading by 120°) to the second end of the adsorber, so as to purge the adsorber during the latter part of the exhaust interval;

(g) supplying second light reflux gas from the buffer chamber to the second end of the adsorber, so as to partially repressurize the adsorber prior to the next feed interval;

(h) supplying third light reflux gas from another adsorber (whose phase is leading by 120°) to the second end of the adsorber, so as to further repressurize the adsorber prior to the next feed interval; and (i) cyclically repeating the above steps, while feed gas is continuously supplied to substantially one adsorber at a time, and exhaust gas is continuously removed from substantially one adsorber at a time.

According to another aspect of the invention there is provided an apparatus for pressure swing adsorption separation of a gas mixture containing a more readily adsorbed component and a less readily adsorbed component, with the more readily adsorbed component being preferentially adsorbed from the gas mixture by an adsorbent material under increase of pressure between a lower pressure and a higher pressure, so as to separate from the gas mixture a heavy product gas enriched in the more readily adsorbed component and a light product gas depleted in the more readily adsorbed component; the apparatus including an adsorber rotor cooperating with a stator mutually defining the rotational axis of the rotor and with rotor drive means to rotate the rotor at a rotational period which defines a pressure swing adsorption cycle period, the rotor containing at least one cooperating set of three adsorbers equally angularly spaced about the rotational axis, each adsorber having a flow path contacting the adsorbent material between first and second ends of the adsorber, the first ends of the adsorbers communicating by first apertures to a first valve surface between the rotor and the stator, and the second ends of the adsorbers communicating by second apertures to a second valve surface between the rotor and the stator; the first valve surface having feed and exhaust ports engaging successively in fluid communication with the first apertures, and the first valve surface having a light product port, and a first, second and third light reflux exit ports and first, second and third light reflux return ports engaging successively in fluid communication with the second apertures; the apparatus further including feed supply means communicating to the feed port and second product exhaust means communicating to the exhaust port; the first and third light reflux exit ports communicating directly to the first and third light reflux return ports respectively, and the second light reflux exit port communicating to a buffer chamber communicating in turn to the second light reflux return port; and the angular positions and widths of the ports and apertures being configured so that for each adsorber in sequence the following steps are performed:

(a) the first aperture of the adsorber is opened to the feed port through which feed gas mixture is supplied by the feed supply means over a feed interval of substantially 1/3 of the cycle period so as to pressurize the adsorber to substantially the higher pressure, while the second aperture of the adsorber is then opened to the light product port in the feed interval so as to deliver light product gas at substantially the higher pressure less flow frictional pressure drops;

(b) the second aperture of the adsorber is opened sequentially to the first, second and third light reflux exit ports so as to deliver light reflux gas enriched in the less readily adsorbed component and to depressurize the adsorber after the feed interval;

(c) the first aperture of the adsorber is opened to the exhaust port through which second product gas is exhausted by the second product exhaust means at an exhaust pressure over an exhaust interval which is substantially 1/3 of the cycle period so as to depressurize that adsorber to substantially the lower pressure and to deliver the second product gas;

(d) the second aperture of the adsorber is opened sequentially to the third, second and first light reflux return ports so as to purge the adsorber in the latter part of the exhaust interval and then to partially repressurize the adsorber prior to the next feed interval.

Further objects and advantages of the invention will become apparent from the description of preferred embodiments of the invention below.

BRIEF DESCRIPTION OF THE DRAWINGS

The preferred embodiments of the present invention will now be described, with reference to the drawings, in which.

DETAILED DESCRIPTION OF THE PREFERRED EMBODIMENTS

Figure 1:
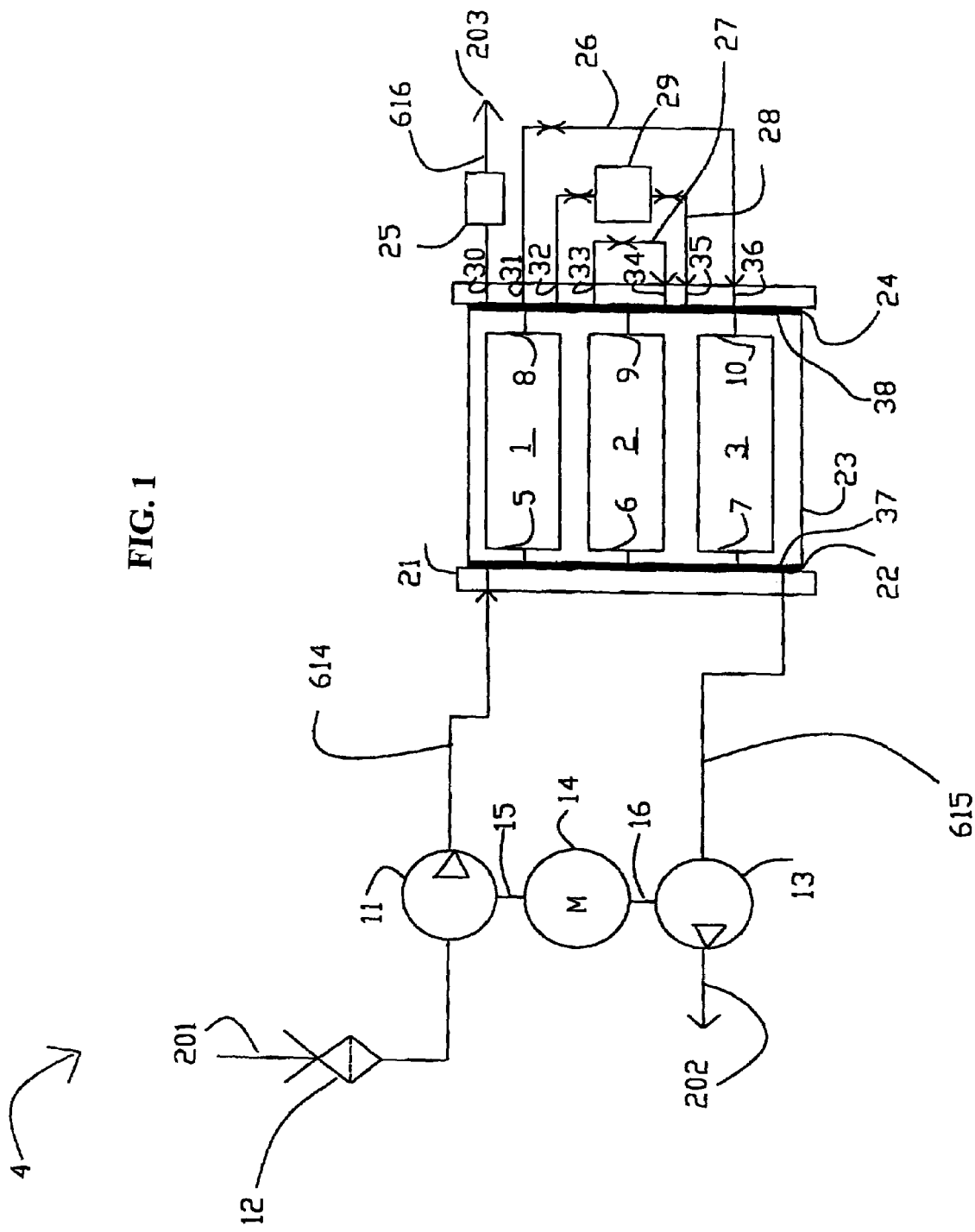
FIG. 1 shows a simplified schematic of a rotary vacuum oxygen concentrator with three adsorbers, a feed air compressor, and an exhaust vacuum pump.
Figure 2:
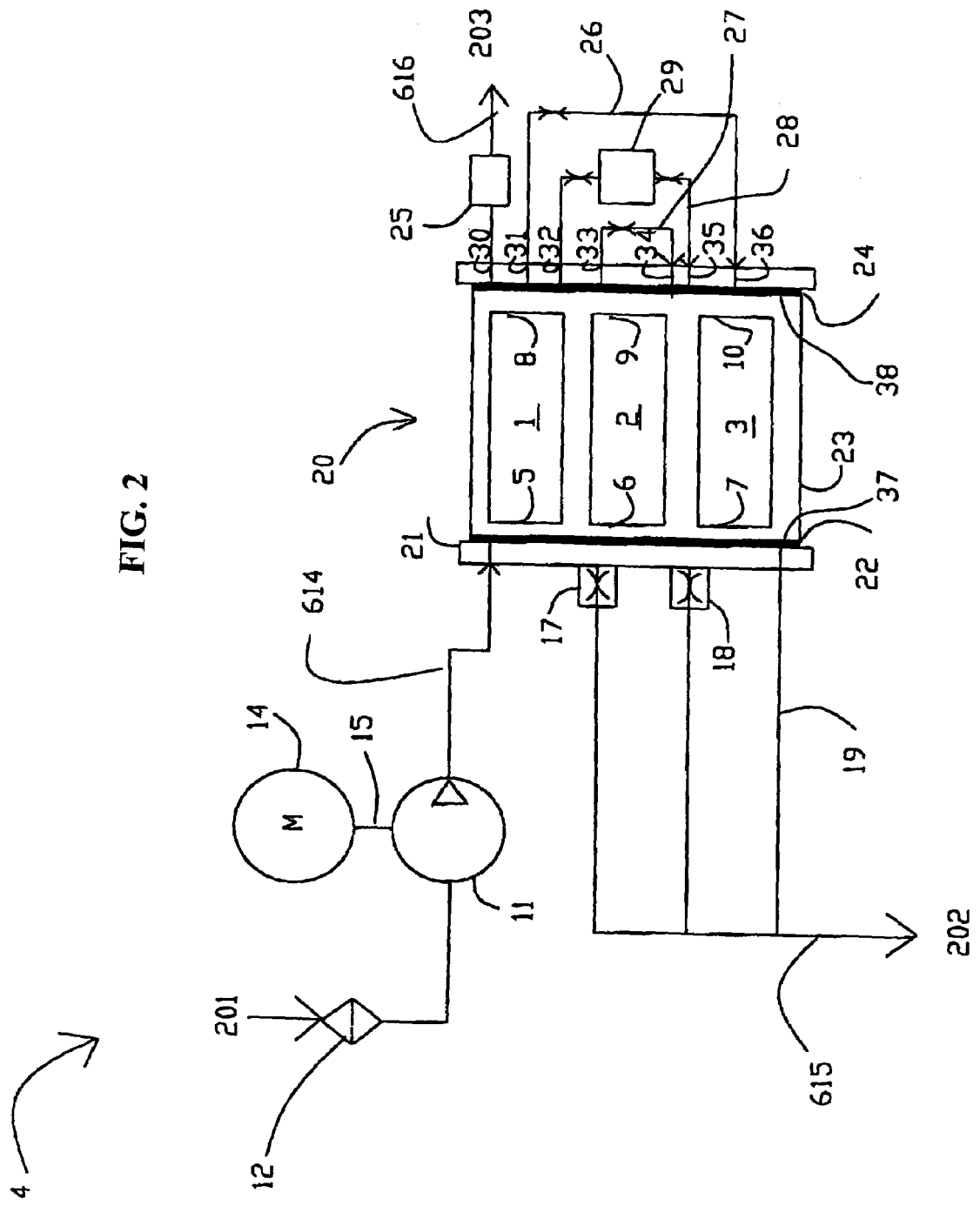
FIG. 2 shows a schematic of a rotary positive pressure oxygen concentrator with three adsorbers, with each adsorber communicating to a feed air compressor.
Figure 3:
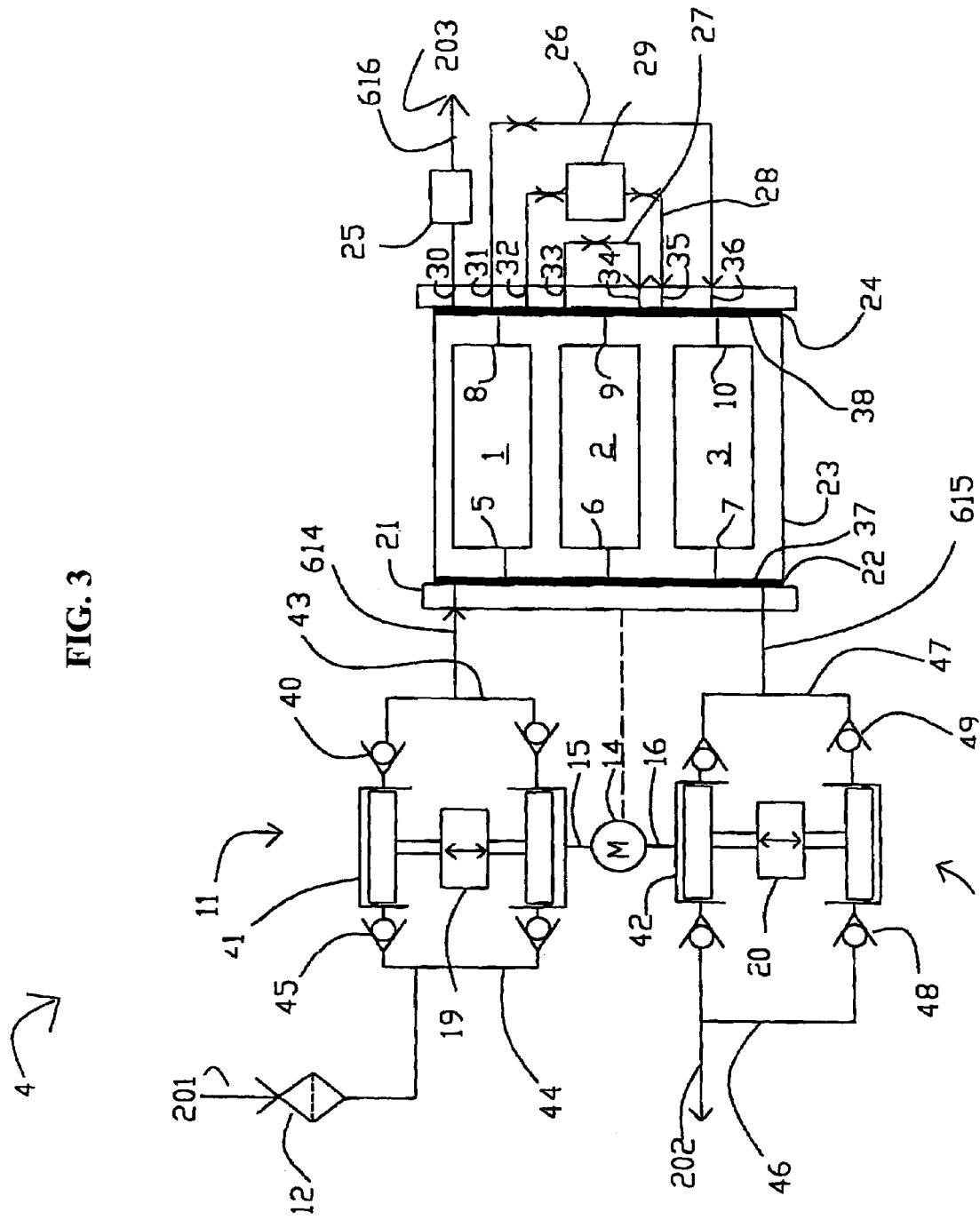
FIG. 3 shows a more detailed schematic of a rotary vacuum oxygen concentrator apparatus with three adsorbers, with each adsorber communicating to a feed air compressor, and an exhaust vacuum pump.

FIGS. 1, 2 and 3

An oxygen concentrator according to an embodiment of the invention has three adsorbers 1, 2 and 3 in apparatus 4 (the rotary PSA module); the adsorbers having respectively first ends 5, 6 and 7, and second ends 8, 9 and 10. The PSA cycle is performed in the three adsorbers, with a phase shift of 120° between the adsorbers in the sequence of adsorbers 1, 2 and then 3. Alternatively, the concentrator may have more than one set of 3 adsorbers, wherein the PSA cycle is performed in the three adsorbers in each of the sets, and the adsorbers in a single set are separated by a phase shift of 120°. FIGS. 1 and 3 show vacuum assisted embodiments, while FIG. 2 shows a positive pressure embodiment without vacuum assist.

Compressor 11 is provided to draw feed air through inlet filter 12 from feed 201 and conduit 614, and to supply compressed feed air to the adsorbers through first ends 5, 6 and 7. In FIGS. 1 and 3, an exhauster 202 as vacuum pump 13 is provided to exhaust nitrogen enriched air waste along piping 615 from first ends 5, 6 and 7. Motor 14 is provided to drive compressor 11 by shaft 15 and vacuum pump 13 by shaft 16. Product 203 is expelled from piping 616 leading from second ends 8, 9 and 10.

FIG. 2 shows a rotary positive pressure PSA oxygen concentrator. In this embodiment, the vacuum pump 13 is replaced with exhaust conduits incorporating throttle orifices 17 and 18 for controlled pressure release during countercurrent blowdown, and a low pressure exhaust conduit 19 exhausting directly to atmosphere.

Apparatus 4 includes a rotary adsorber module 20 including a stator 21, first stator valve face 22, rotor 23 and second stator valve face 24. Product delivery valve 25 delivers product. Purge is recycled through conduit 26, while backfill is transferred through conduit 27. Equalization occurs through conduit 28 and through buffer chamber 29.

In this embodiment and those shown in FIGS. 2 and 3, the adsorber housing body rotates and is referred to as the rotor, while the first and second valve bodies are the stator and are referred to as the first and second valve faces.

Second stator valve face 24 defines first, second and third light reflux exit ports 31, 32 and 33, respectively. Second stator valve face 24 also defines first, second and third light reflux return ports 34, 35 and 36, respectively. A light product delivery port 30 is also provided in second stator valve face 24.

FIG. 3 shows a specific example of a two-cylinder double acting piston machine with the two pistons 19 and 20 operating in opposite phase facilitated by reciprocating crank drives. It shows a more detailed look at the compressor and vacuum pump assemblies. The filtered air from inlet air filter 12 travels through the inlet check valve 45 and enters the feed chamber 41. It then is expelled through discharge check valve 40, making its way to the stator 21. Compressor intake manifold 44 collects the air to be used for compression. Compressor exhaust manifold 43 provides the piping for the exhaust air from the compressor.

Exhaust chamber 42 collects the exhaust from the PSA unit. Pump intake manifold 47 and pump exhaust manifold 46 are the piping assemblies that accomplish the air transfer for the pump. Inlet check valve 49 regulates the flow of exhaust into the exhaust chamber 42. Discharge check valve 48 regulates the exiting stream.

If the pistons are reciprocating at a frequency much greater than the frequency of the rotor, then the system is simply a piston compressor embodiment as in FIG. 1. However, an alternative is to synchronize piston reciprocation in both frequency and phase with the PSA cycle so that a complete feed step A1 is accomplished by a simple stroke of a compressor piston, and an exhaust step E1 is accomplished by a single stroke of a vacuum pump piston. The reciprocating frequency of the compressor and vacuum is set to be exactly 1.5 times the frequency of the cycle. Pressure variations within the PSA cycle are thus coordinated with those within the compressor and vacuum pump cylinders, enabling an improvement in efficiency and substantially eliminating pressure and flow pulsations extraneous to the PSA cycle itself.

These actions are facilitated by reciprocating crank drives. This is useful for use in manual drives (manual or foot pedal power with a pulley linkage between the motor and the rotor). The manual apparatus could be used in emergency situations such as at altitude or in confined spaces such as in submarines or in mine shafts.

Furthermore, power consumption is reduced since the compressor 11 and vacuum pump 13 each follow the changing pressure of the adsorber for respectively feed pressurization and countercurrent blowdown steps. Thus, the average working pressure across each of the compressor 11 and vacuum pump 13 is much less than the maximum working pressure.

According to one embodiment, the compressor has two compression chambers in opposed phase in which the volume of the compression chambers can be cyclically varied by operation of a compressor drive means at a cyclic period that is 2/3 of the rotational period of the adsorber rotor. The compressor drive means is synchronized with the adsorber rotor drive means so that one compression chamber supplies feed gas to an adsorber over its feed interval, and the other compression chamber supplies feed gas to the next adsorber over its feed interval. The vacuum pump may have two pump chambers in opposed phase in which the volume of the pump chambers can be cyclically varied by operation of a vacuum pump drive means at a cyclic period that is 2/3 of the rotational period of the adsorber rotor. The vacuum pump drive means is synchronized with the adsorber rotor drive means so that one pump chamber exhausts second product gas from an adsorber over its exhaust interval, and the other pump chamber exhausts second product gas from the next adsorber over its exhaust interval.

In an alternative embodiment, discrete multiple compression or vacuum piston reciprocations may be synchronized in both frequency and phase with the PSA cycle. For example, in an exemplary embodiment where the integer multiple is chosen to be 3, three full compression piston strokes may be completed to supply feed gas during each complete feed step A1, and similarly, three vacuum piston strokes may be completed to accomplish exhaust step E1. In this exemplary case, the reciprocation frequency of the piston may be synchronized to be the same integer multiple (in this case the multiplier is 3) of the reciprocation frequency in the single stroke case above, or 3×(1.5)=4.5 times the frequency of the PSA cycle. Implementation of multiple compression or vacuum piston strokes per step of the PSA cycle such as in the present alternative embodiment allows the reduction of the compressor/vacuum piston chamber volume while maintaining the same PSA system capacity. Further, the present alternative embodiment provides the additional benefit of reducing power consumption for compression/vacuum system(s) since the energy required by the compressor, 11 and /or vacuum pump 13 increases and decreases in accordance with the variation of the pressure of the adsorber during feed pressurization (compression) and countercurrent blowdown (vacuum depressurization) steps, and may substantially eliminate pressure and flow pulsations extraneous to the PSA cycle. In the present alternative embodiment, it is understood that the multiple used to determine the number of compressor/vacuum piston strokes completed per step of the PSA cycle may be chosen to be any discrete integer multiple, particularly an integer multiple greater than one, and that the case where the multiple is three is simply one example.

Figure 4:
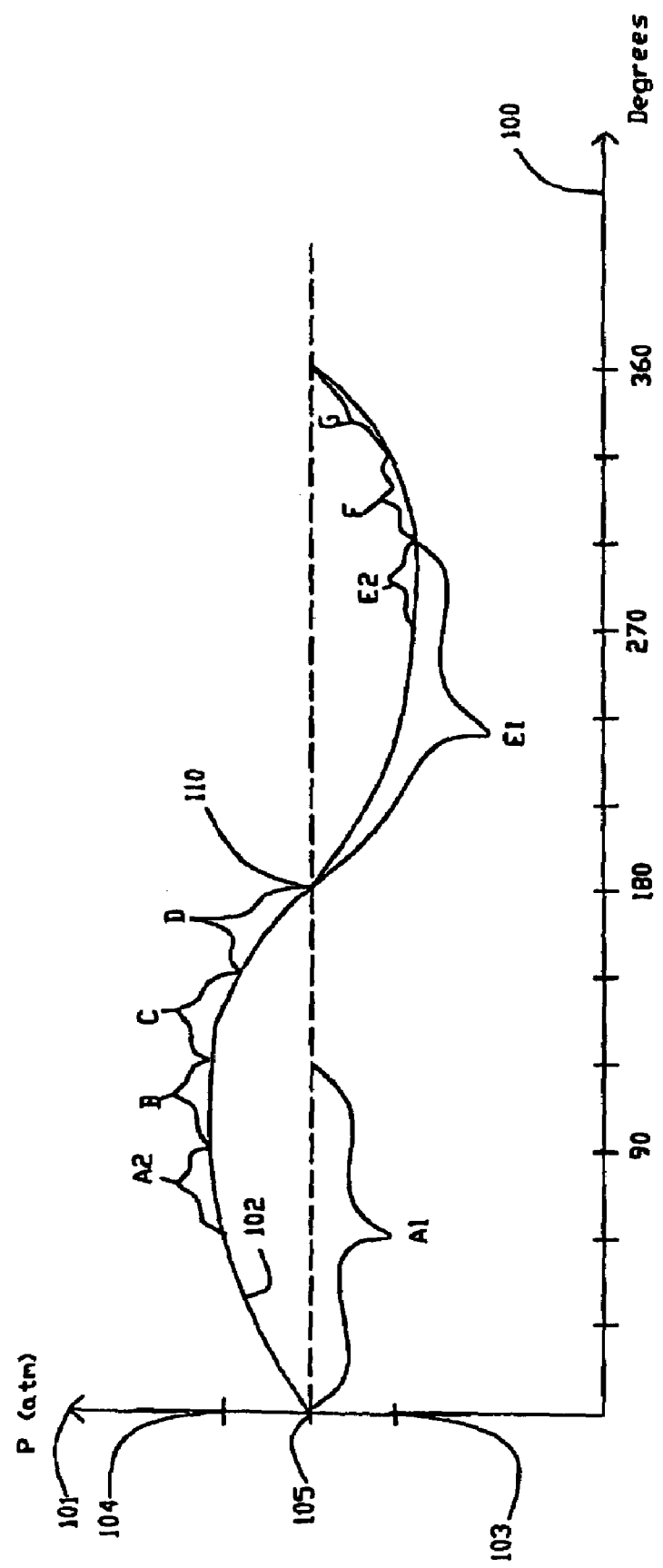
FIG. 4 shows the gas flow pattern and pressure pattern associated with an adsorber of the apparatus of FIG. 1.
Figure 5:
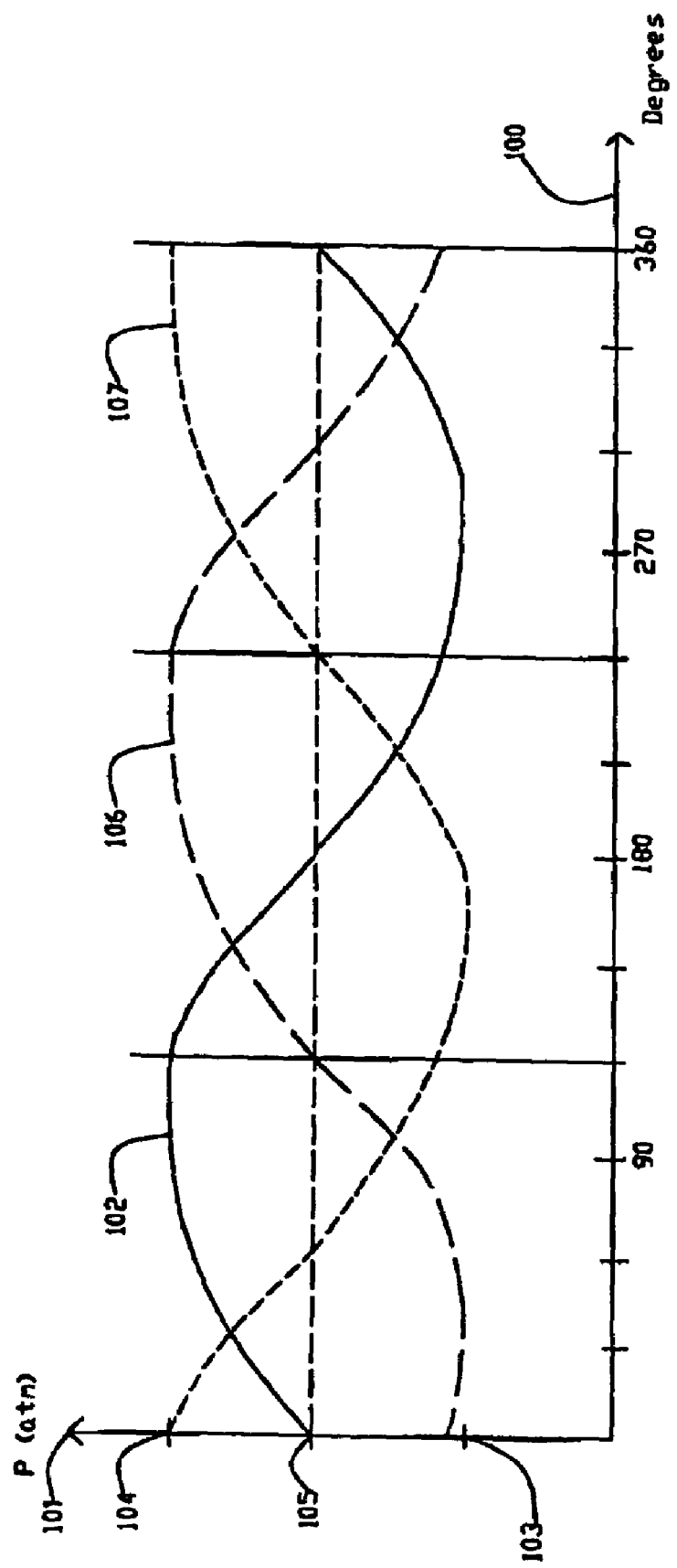
FIG. 5 shows the pressure pattern for all three adsorbers, in the format to which the invention shall be applied.

FIGS. 4 and 5

FIGS. 4 and 5 show the 360° position variation of the gas flow over a cycle period in the adsorbers of the apparatus of FIGS. 1 and 3. FIG. 4 shows the cycle for adsorber 1, while FIG. 5 shows the cycle for all three adsorbers. Note that the three adsorbers charted in FIG. 5 are 120° out of phase from each other. In alternative embodiments including more than one set of three adsorbers, the 3 adsorbers within a given set may be operated according to the 3-adsorber cycle pattern described above wherein the adsorbers are 120° out of phase from each other. Continuous product flow can be obtained in embodiments with more than one set of adsorbers. For example, with two sets of three adsorbers (e.g., X1, X2, X3 and Y1, Y2 and Y3) the phase for each adsorber X1, X2, X3, Y1, Y2 and Y3 may be offset from each other respectively by 60° to obtain continuous product flow. Viewed another way, product can be obtained twice as often with two sets of adsorbers compared to one set of adsorbers.

The horizontal axis 100 of FIG. 4 represents position, in 30° fractions of the cycle period. The vertical axis 101 represents the working pressure in adsorber 1.

Curve 102 shows the position variation of the flow path through the valve face plates, with the system pressure cycling between higher pressure 104 and the lower pressure 103, 105 and 110 are the intermediate pressures in the cycle.

The cycle is divided into six process steps.

1. The feed pressurization step extends over the feed time interval from positions 0° degrees to 120° of the cycle period on horizontal axis 100. At the beginning of the cycle (0°), feed gas is fed through inlet filter 12 to compressor 11 and the first end of the adsorbers, bringing the system to its higher pressure 104. The feed step includes feed from first intermediate pressure 105 to the higher pressure 104. Typically, the first intermediate pressure is nominally atmospheric pressure.

2. A2 and B: Feed with production and production for backfill (pressurization with gas enriched in the second component). In step A2, between 60° and 90°, light product gas is withdrawn from the second end of adsorber 1 through the light product port. Between 90° and 120° (step B), light reflux is withdrawn from the second end of adsorber 1 to backfill adsorber 2.

3. C and D: The concurrent blowdown step extends over the concurrent blowdown interval from 120° to 180°. Between 120° and 150° (step C), light reflux gas is withdrawn from the second end of adsorber 1 to equalize the buffer chamber 29. During 150° to 180° (step D), light reflux gas is removed from the second end of adsorber 1 to purge adsorber 3. The concurrent blowdown step begins at substantially the higher pressure 104 and ends at a second intermediate pressure 110, which typically may be approximately equal to the first intermediate pressure 105.
4. E1: The countercurrent blowdown (to exhaust) interval E1 extends from 180° to 300°, bringing the system down from second intermediate pressure 110 to its lower pressure 103.
5. E2: Purge to exhaust. During step E2, gas is removed between 270°–300° from the second end of adsorber 2 to purge adsorber 1. Exhaust is removed from the first end of adsorber 1 from 270°–300°.
6. F and G: The countercurrent re-pressurization step extends from 300° to 360°. The cycle between 300°–330° (step F) equalizes the second end of adsorber 1 from the buffer chamber 29. The cycle between 330°–360° (step G) is applied to backfilling adsorber 1 from adsorber 3.

The following sequence table illustrates the above sequence description.

different stages of the cycle. Piping connects three laminate adsorbers 204 to buffer chamber 29. Feed is input through feed port 201. Exhaust is released through exhaust port 202. Product is sent through product port 203. Outer housing 207 contains the rotor assembly 208. The rotor assembly 208 includes a central core which is cylindrical and concentric with the axis 211. Cross sections 212, 213 and 214 are described in FIGS. 7 through 10.

Figure 6:
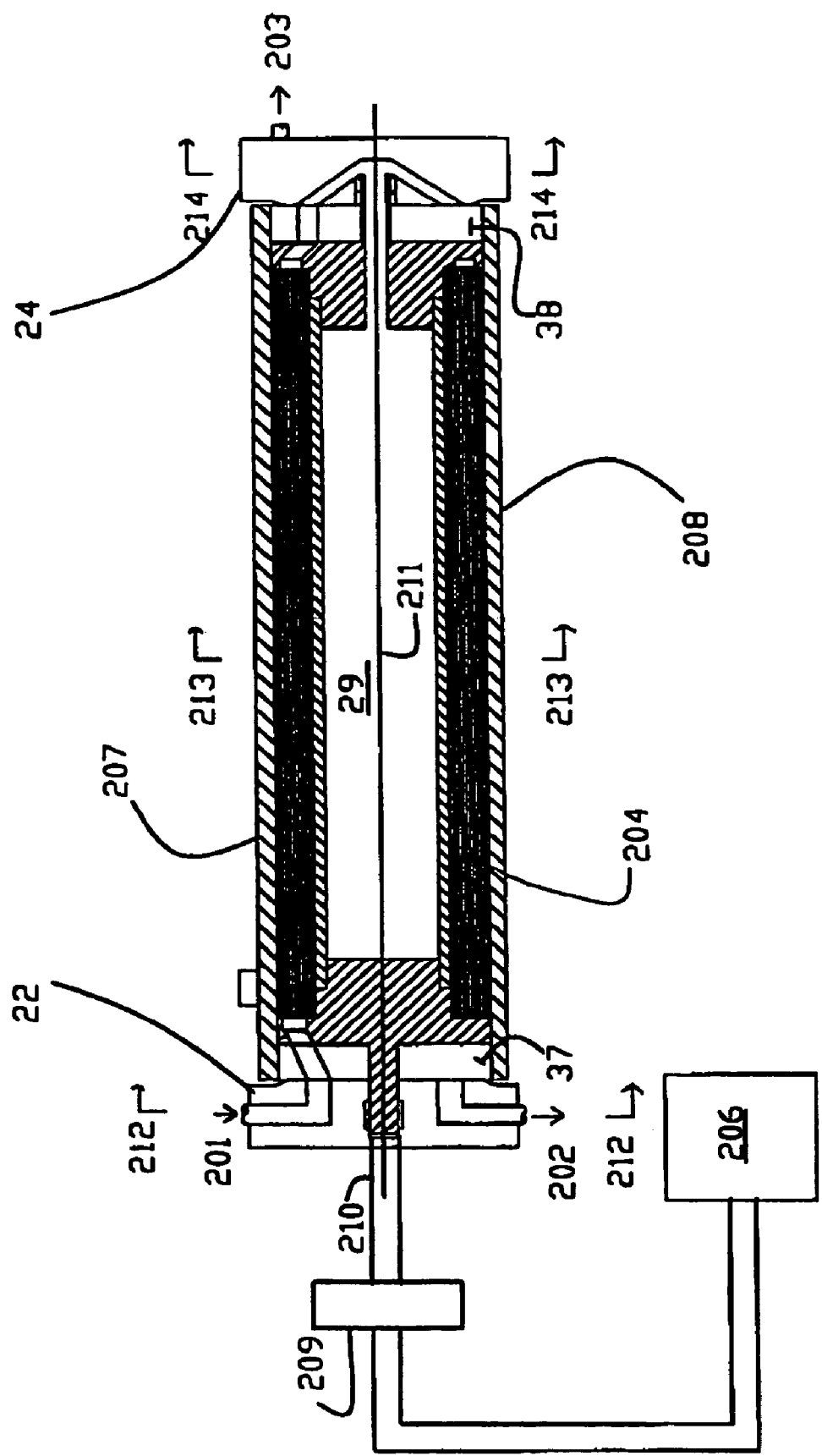
FIG. 6 shows a cross section of a rotary module of an oxygen concentrator, with each of the two valve ends being shown at a different point in the cycle.
Figure 7A:
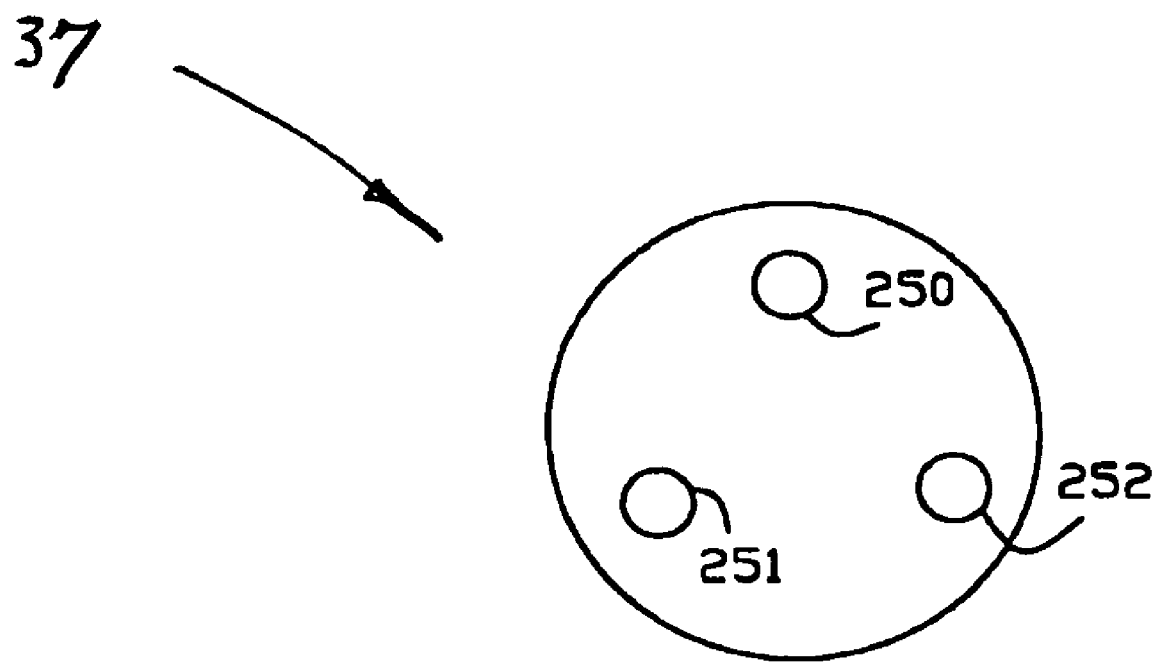
FIG. 7a is a cross sectional view of a first rotor valve face in the apparatus of FIG. 6 taken along view line 212.
Figure 7B:
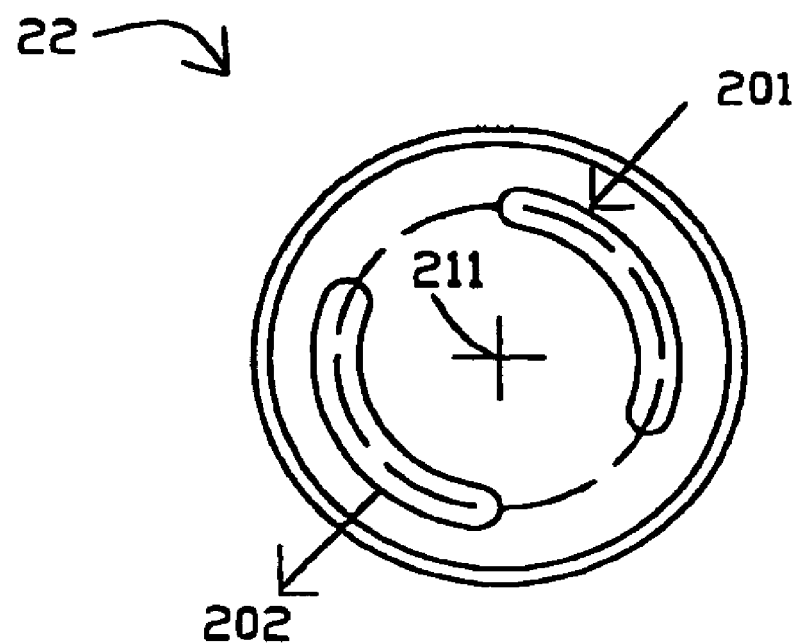
FIG. 7b is a cross sectional view of a first stator valve face in the apparatus of FIG. 6 taken along view line 212.

FIGS. 7*a* and 7*b* (Both Figures are Taken at the Cross Section 212 of FIG. 6.)

FIG. 7*a* shows the first rotor valve face 37. Apertures 250 (H1), 251 (H2) and 252 (H3) on the face plate facilitate the flow action of gases from one adsorber to another corresponding to the sequencing defined in the FIG. 4/5 description. H1, H2 and H3 correspond to the first rotor valve openings for adsorbers 1, 2 and 3, respectively.

FIG. 7*b* shows the first stator valve face 22. Feed enters through feed port aperture 201 and exhaust exits through exhaust port aperture 202.

Both figures can are taken at the cross section 212 on FIG. 6.

Figure 8A:
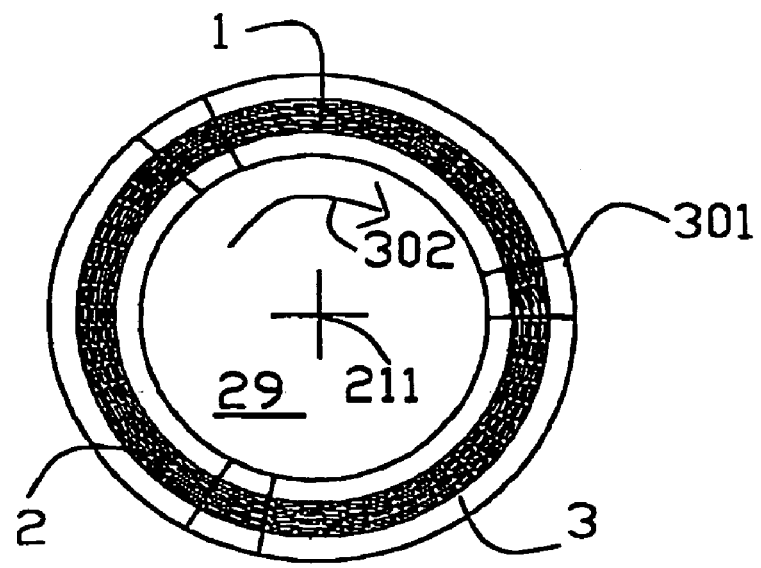
FIG. 8a is a cross sectional view of a rotor laminate adsorber in the apparatus of FIG. 6 taken along view line 213.
Figure 8B:
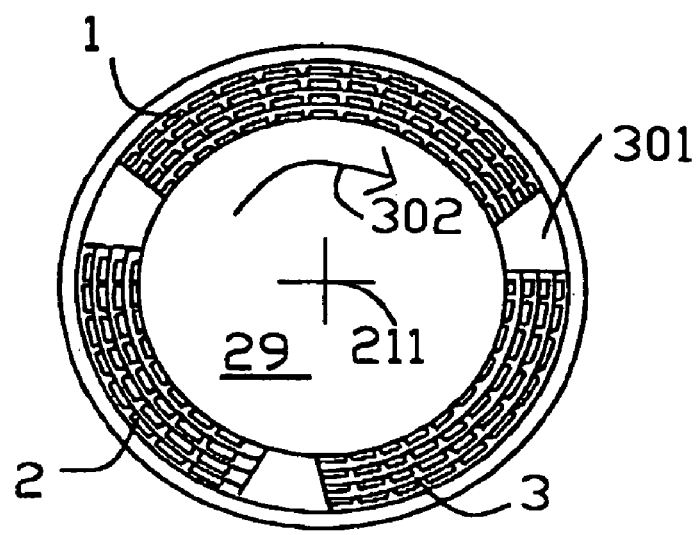
FIG. 8b is another cross sectional view of a rotor laminate adsorber in the apparatus of FIG. 6 taken along view line 213.

FIGS. 8*a* and 8*b*

FIG. 8*a* shows the rotor laminate adsorber cross section. It is a cross section located at the 213 position on FIG. 6. Note that it is a single spiral wound with spacers separating

TABLE 1

| | | Adsorber 1 | | | Adsorber 2 | | | Adsorber 3 | | |
|---|---|---|---|---|---|---|---|---|---|---|
| Step | Time | 1st Stator valve | 2nd Stator Valve | State | 1st Stator valve | 2nd Stator Valve | State | 1st Stator valve | 2nd Stator Valve | State |
| 1 | 0–30 | F to H1 | Closed | Feed pressurization | Closed | L2 to B | Provide buffer gas | H3 to E | Closed | Exhaust |
| 2 | 30–60 | F to H1 | Closed | Feed pressurization | Closed | L2 to L3 | Provide purge | H3 to E | L2 to L3 | Purge |
| 3 | 60–90 | F to H1 | L1 to P | Production | H2 to E | Closed | Exhaust | Closed | B to L3 | Pressurization from buffer |
| 4 | 90–120 | F to H1 | L1 to L3 | Provide product pressurization | H2 to E | Closed | Exhaust | Closed | L1 to L3 | Product pressurization |
| 5 | 120–150 | Closed | L1 to B | Provide buffer gas | H2 to E | Closed | Exhaust | F to H3 | Closed | Feed pressurization |
| 6 | 150–180 | Closed | L1 to L2 | Provide purge | H2 to E | L1 to L2 | Purge | F to H3 | Closed | Feed pressurization |
| 7 | 180–270 | H1 to E | Closed | Exhaust | Closed | B to L2 | Pressurization from buffer | F to H3 | L3 to P | Production |
| 8 | 210–240 | H1 to E | Closed | Exhaust | Closed | L3 to L2 | Product pressurization | F to H3 | L3 to L2 | Provide product pressurization |
| 9 | 240–270 | H1 to E | Closed | Exhaust | F to H2 | Closed | Feed pressurization | Closed | L3 to B | Provide buffer gas |
| 10 | 270–300 | H1 to E | L3 to L1 | Purge | F to H2 | Closed | Feed pressurization | Closed | L3 to L1 | Provide purge |
| 11 | 300–330 | Closed | B to L1 | Pressurization from buffer | F to H2 | L1 to P | Production | H3 to E | Closed | Exhaust |
| 12 | 330–360 | Closed | L2 to L1 | Product pressurization | F to H2 | L1 to L2 | Provide product pressurization | H3 to E | Closed | Exhaust |

FIG. 6

FIG. 6 shows a cross section of a rotary module of an oxygen concentrator. The bottom left of the figure shows a motor 206 attached to a gear 209, which is in turn attached to drive coupling 210. Rotation of the assembly is about axis 211.

The left side of the diagram shows that the first stator valve face plate 22, while the right side of the diagram shows the second stator valve face plate 24. Rotor valve face plates are represented by 37 and 38 and are described in FIGS. 7 and 10. Note that the two sides of the drawing are shown at the layers. The three adsorber sections 1, 2 and 3 are shown separated by sealant separators 301 that are impregnated in the laminate adsorber. Buffer chamber 29 is located in the center of the rotor apparatus 208. Arrow 302 shows the direction of rotation of the adsorber assembly.

FIG. 8*b* shows multiple sheets of laminate with physical plugs as separators 301. According to one variant, the width of the sheets is not more than about 1/3 of the circumference of the central core of the adsorber rotor.

FIG. 9

Figure 9:
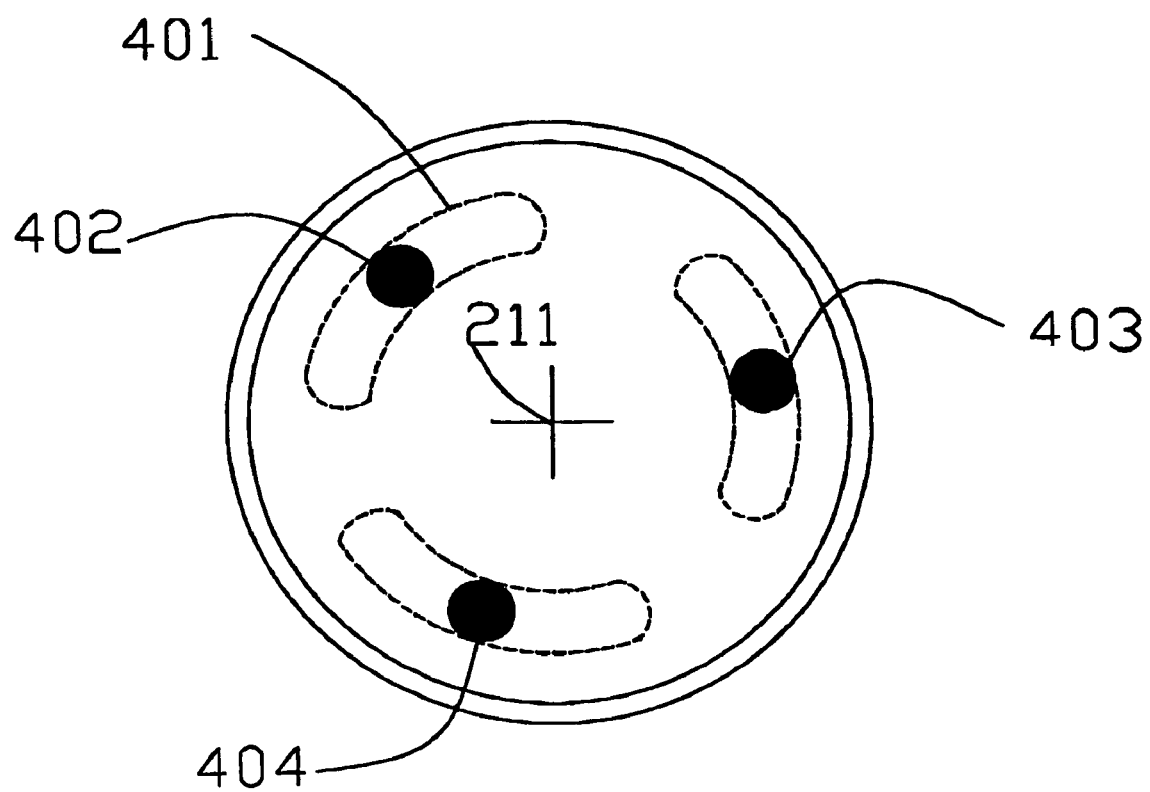
FIG. 9 is cross sectional view of a rotor valve face in the apparatus of FIG. 6 taken in the direction of view line 213.

FIG. 9 shows the rotor valve face cross section. It is a cross section located at the 213 position on FIG. 6. The dashed slots 401 correspond to the relative positions of the adsorbers in the rotor assembly. 402, 403 and 404 represent the rotor port apertures 501, 502 and 503 (as seen in FIG. 10a) or 250, 251 and 252 (as seen in FIG. 7a), depending on which rotor face is being described.

FIG. 10

Figure 10A:
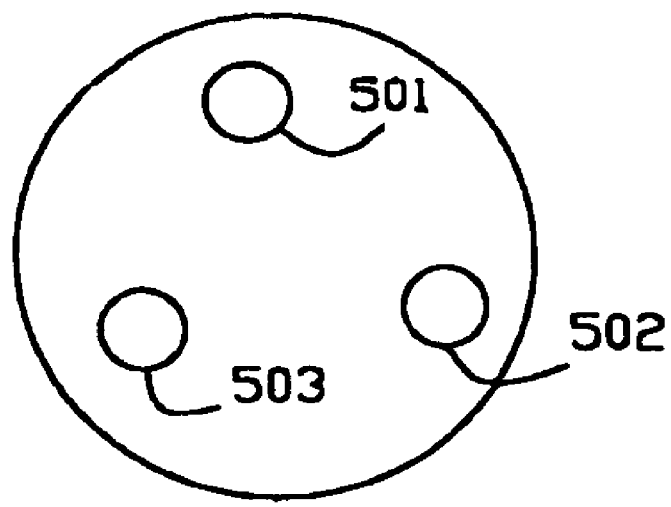
FIG. 10a is a cross sectional view of a second rotor valve face in the apparatus of FIG. 6 taken in the direction of view line 214.
Figure 10B:
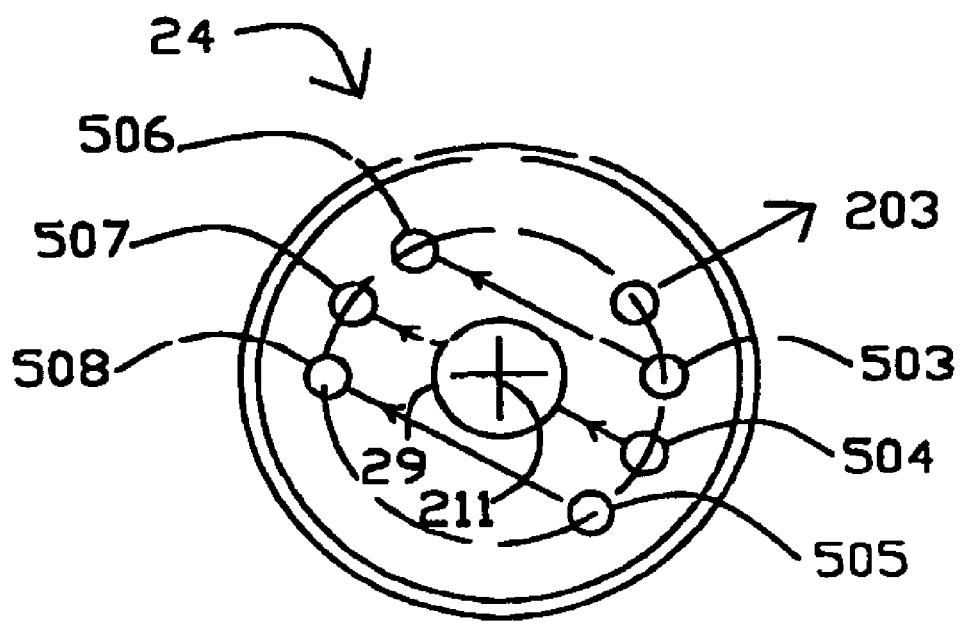
FIG. 10b is a cross sectional view of a second stator valve face in the apparatus of FIG. 6 taken along view line 214.

FIG. 10a shows the second rotor valve face 38. FIG. 10b shows the second stator valve face 24. Both figures are taken at cross section 214 on FIG. 6. Each of the apertures 501 (L1), 502 (L2) and 503 (L3) on the face plate facilitate the flow action of gases from one adsorber to another corresponding to the sequencing defined in the FIG. 4/5 description. L1, L2 and L3 correspond to the second rotor valve openings for adsorbers 1, 2 and 3, respectively.

Reference numerals 503, 504, and 505 indicate first, second and third light reflux exit ports, respectively, and numerals 506, 507, and 508 indicate first, second and third light reflux return ports, respectively. Reference numeral 29 indicates the buffer chamber.

FIG. 11

Figure 11:
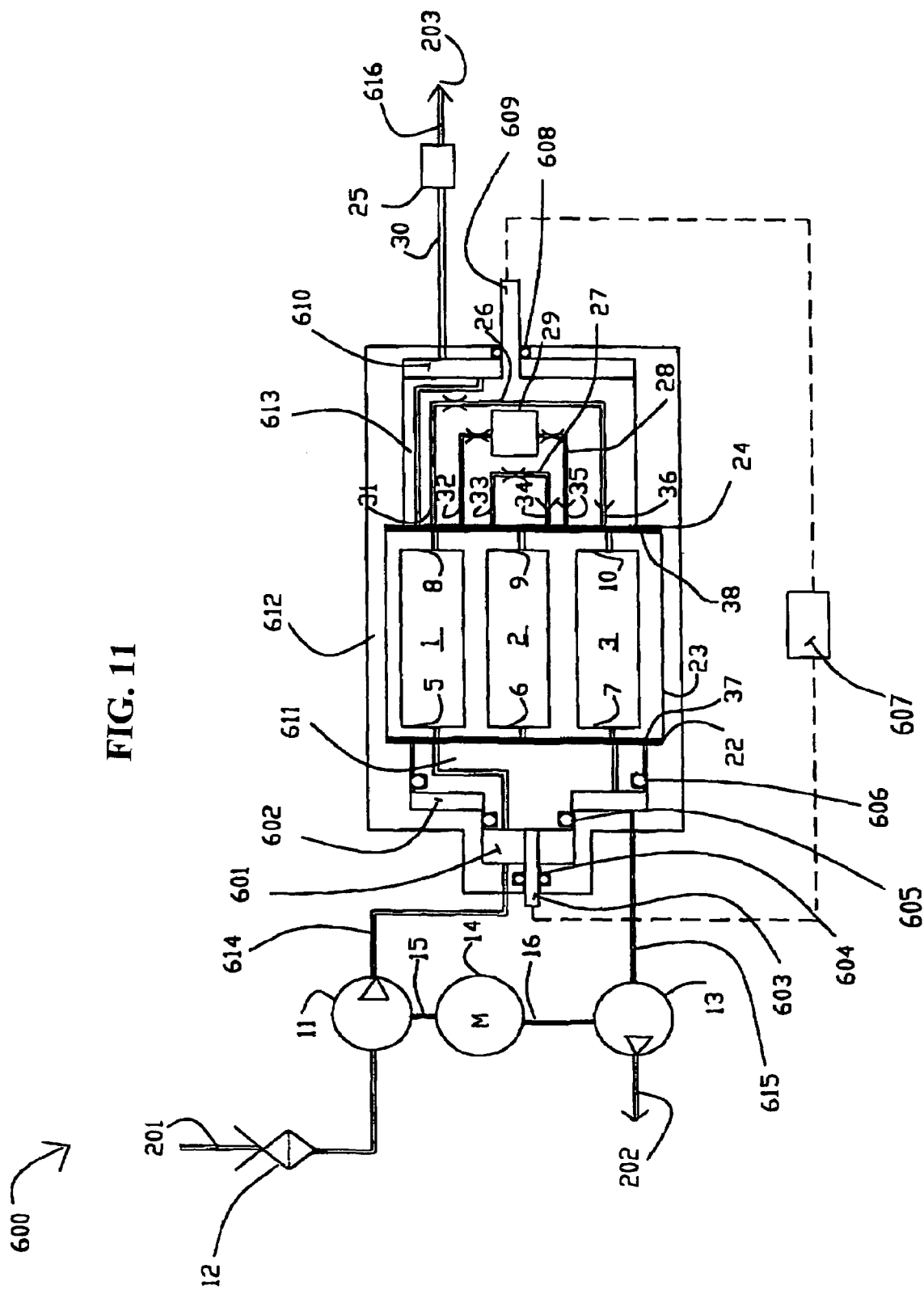
FIG. 11 shows an embodiment similar to FIG. 1 but with the adsorber housing stationary while the first and second valve bodies rotate.

FIG. 11 shows an embodiment 600 similar to FIG. 1, but with the adsorber housing body stationary while the first and second valve bodies rotate.

The adsorbers are mounted at equal angular spacings in an adsorber housing body 23, which is engaged in relative rotation with first and second valve bodies 611 and 613 to define rotary sealing faces of first and second valves adjacent respectively the first and second ends of the adsorber flow paths. There is fluid sealing engagement between the adsorber housing body and respectively the first and second valve bodies. The adsorber housing body 23 is stationary, while the first and second valve bodies 611 and 613 rotate to achieve the valving function. Fluid transfer means are provided to provide feed gas to the first valve body 611, to remove exhaust gas from the first valve body 611, and to deliver product gas from the second valve body 613.

In this embodiment, the first valve body has fluid seals 604 and 605 which define the feed fluid transfer chamber 601 as a fluid transfer means to provide feed gas to the first valve body between the first valve body 611 and the casing 612. Feed gases are conducted through conduit 614.

The first valve body also has fluid seals 605 and 606 which define the exhaust fluid transfer chamber 602 between the first valve body 611 and the casing 612. Chamber 602 is fluid transfer means to remove exhaust gas from the first valve body. Exhaust gases are conducted through conduit 615.

The second valve body 613 has fluid seals 608 that defines the product fluid transfer chamber 610 between the second valve body 613 and the casing 612. Chamber 610 is a fluid transfer means to provide product gas from the second valve body. Product gases are conducted through conduit 616.

There is a shaft for each valve body that drives rotation of the body, with shaft 603 driving first valve body 611 and shaft 609 driving second valve body 613. An option exists for these shafts to be engaged as a single shaft to drive the valve bodies. The shafts are driven to rotate by valve drive means 607, such as a motor.

FIG. 12

Figure 12:
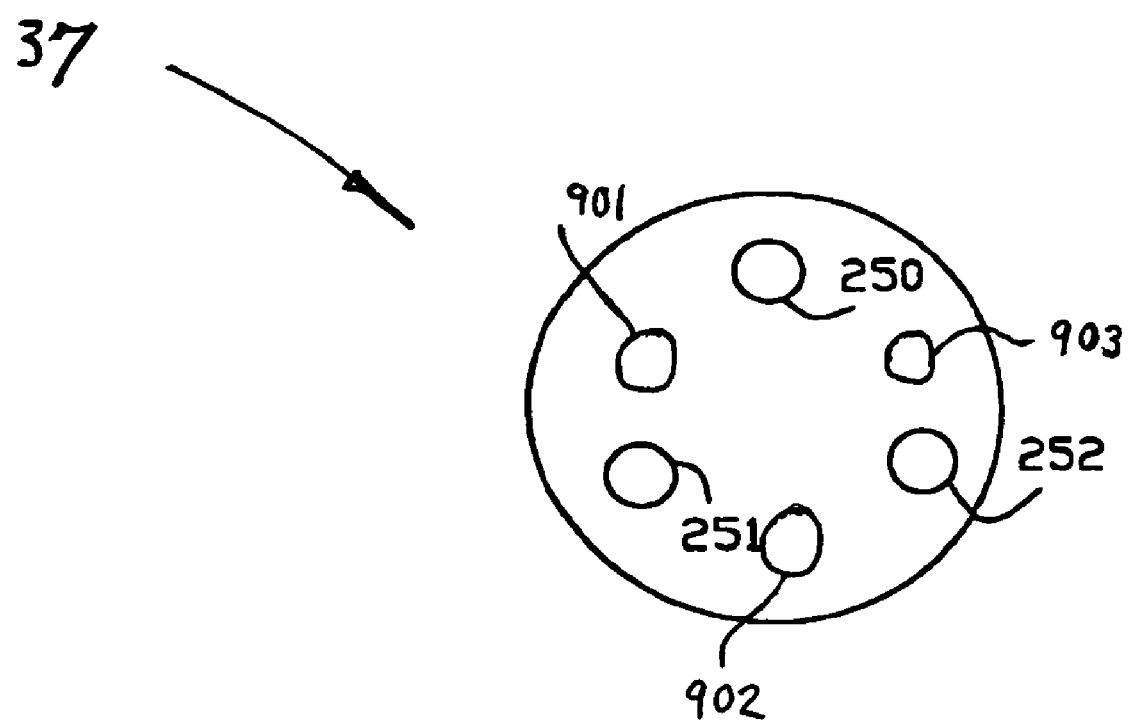
FIG. 12 is a cross sectional view of a first rotor valve face showing two sets of three adsorbers.

FIG. 12 shows an embodiment similar to FIG. 7A except that it includes a second set of first rotor valve openings 901, 902 and 903 for a second set of three adsorbers. Each first rotor valve opening 901, 902 and 903 is spaced from each other by 120° angular separation about the axis defined by rotation of the rotor, and are spaced from rotor valve openings 250, 251 and 252 by 60°, respectively. Of course, more than two sets of adsorbers can be included in a rotary module.

FIG. 13

Figure 13:
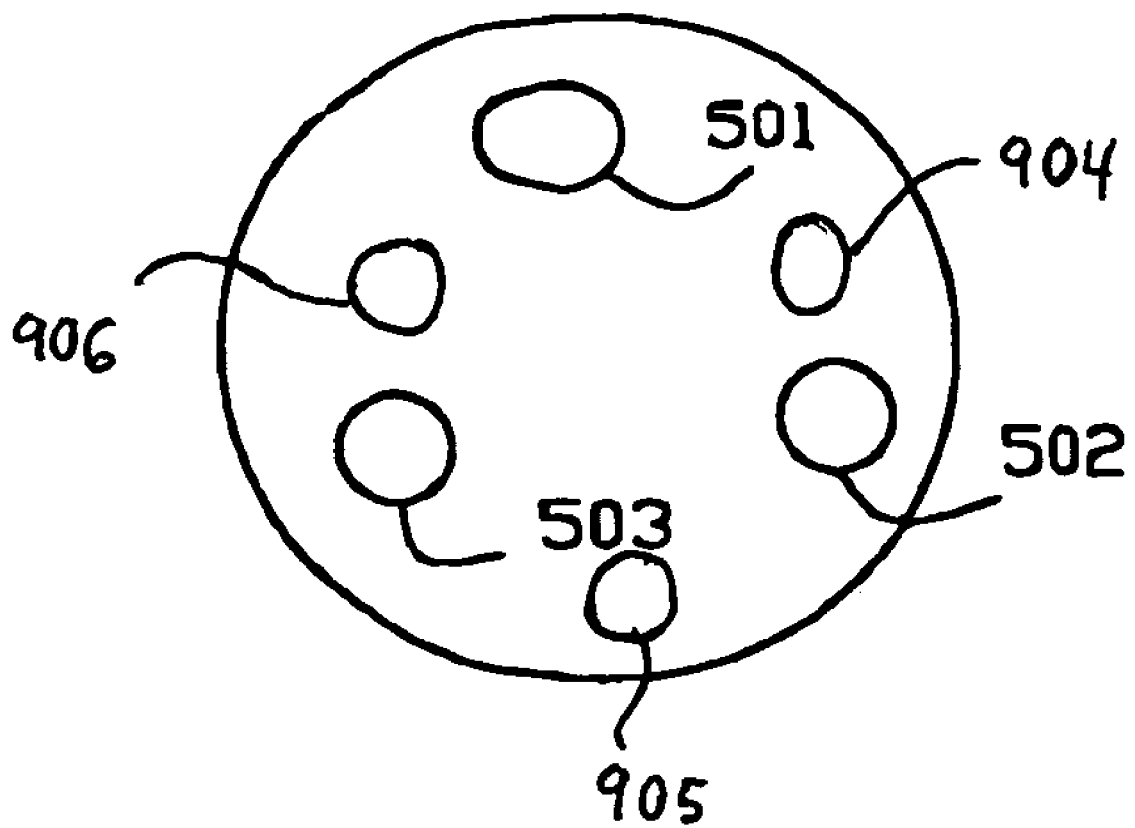
FIG. 13 is a cross sectional view of a second rotor valve face showing two sets of three adsorbers.

FIG. 13 shows an embodiment similar to FIG. 10A except that it includes a second set of second rotor valve openings 904, 905 and 906 for a second set of three adsorbers. Each first rotor valve opening 904, 905 and 906 is spaced from each other by 120°, and are spaced from rotor valve openings 501, 502 and 503 by 60°, respectively. Of course, more than two sets of adsorbers can be included in a rotary module.

Although certain preferred embodiments of the present invention have been shown and described in detail, it should be understood that various changes and modifications may be made therein without departing from the scope of the appended claims.

What is claimed is:

1. A process for pressure swing adsorption separation of a feed gas mixture in a pressure swing adsorption apparatus comprising at least one set of three adsorbers incorporated within a rotary adsorber module, and a compressor comprising at least one compressor piston fluidly coupled to the rotary adsorber module, the process comprising:

for each adsorber within a set of three adsorbers, establishing a pressure swing adsorption cycle comprising providing the feed gas mixture to the adsorber, withdrawing a product gas from the adsorber, withdrawing an exhaust gas from the adsorber; and synchronizing the compressor piston stroke with the adsorption cycle such that the feed gas mixture is provided to each adsorber in turn during a feed step of the adsorption cycle by an integer multiple of strokes of the compressor piston.

2. The process according to claim 1 wherein the rotary adsorption module comprises at least one set of three adsorbers disposed within a housing that is rotatably coupled to at least one valve body.

3. A process for pressure swing adsorption separation of a feed gas mixture in a pressure swing adsorption apparatus comprising at least one set of three adsorbers incorporated within a rotary adsorber module, and a vacuum pump comprising at least one vacuum pump piston fluidly coupled to the rotary adsorber module, the process comprising:

for each adsorber within a set of three adsorbers, establishing a pressure swing adsorption cycle comprising providing the feed gas mixture to the adsorber, withdrawing a product gas from the adsorber, withdrawing an exhaust gas from the adsorber; and synchronizing the vacuum pump piston stroke with the adsorption cycle such that the exhaust gas is withdrawn from each adsorber in turn during an exhaust step of the adsorption cycle by an integer multiple of strokes of the vacuum pump piston.

4. The process according to claim 3 wherein the rotary adsorption module comprises at least one set of three adsorbers disposed within a housing that is rotatably coupled to at least one valve body.

5. The process according to claim 1 wherein the compressor and the rotary adsorber module are driven using manual drive means powered by hand.

6. The process according to claim 3 wherein the vacuum pump and the rotary adsorber module are driven using manual drive means powered by hand.

7. The process according to claim 1, wherein the integer multiple is greater than one.

8. The process according to claim 3, wherein the integer multiple is greater than one.

* * * * *